United States Patent
Islas

(10) Patent No.: US 6,237,928 B1
(45) Date of Patent: May 29, 2001

(54) PEDALED PROPULSION SYSTEM

(76) Inventor: John J. Islas, 8504 Sextant Dr., Baldwinsville, NY (US) 13027

(*) Notice: Subject to any disclaimer, the term of this patent is extended or adjusted under 35 U.S.C. 154(b) by 0 days.

(21) Appl. No.: 09/383,493

(22) Filed: Aug. 26, 1999

Related U.S. Application Data

(60) Provisional application No. 60/098,531, filed on Aug. 31, 1998.

(51) Int. Cl.[7] ........................................ B62M 1/04
(52) U.S. Cl. ........................................ 280/252; 280/258
(58) Field of Search .................................. 280/252, 253, 280/254, 255, 256, 257, 258, 259, 260, 261

(56) References Cited

U.S. PATENT DOCUMENTS

| | | | | |
|---|---|---|---|---|
| 556,802 | * | 3/1896 | Boyle | 280/241 |
| 566,838 | * | 9/1896 | Boyle | 280/241 |
| 584,200 | | 6/1897 | Wheatley . | |
| 719,595 | * | 2/1903 | Huss | 280/252 |
| 1,019,637 | * | 3/1912 | Hays | 280/252 |
| 3,079,161 | * | 2/1963 | Rogers | 280/1.191 |
| 3,820,820 | * | 6/1974 | Kutz | 280/252 |
| 3,891,235 | * | 6/1975 | Shelly | 280/252 |
| 4,169,609 | * | 10/1979 | Zampedro | 280/241 |
| 4,953,882 | * | 9/1990 | Craig, Jr. | 280/258 |
| 5,156,412 | * | 10/1992 | Meguerditchian | 280/241 |
| 5,236,211 | * | 8/1993 | Meguerditchian | 281/241 |
| 5,335,927 | | 8/1994 | Islas | 280/255 |
| 5,540,111 | * | 7/1996 | Barnett et al. | 74/30 |
| 5,690,345 | * | 11/1997 | Kiser | 280/210 |
| 5,785,337 | * | 7/1998 | Ming | 280/255 |
| 5,979,922 | * | 11/1999 | Becker et al. | 280/252 |

* cited by examiner

Primary Examiner—Robert P. Olszewski
Assistant Examiner—Andrew J. Fischer
(74) Attorney, Agent, or Firm—Bernhard P. Molldrem, Jr

(57) ABSTRACT

A pedaled propulsion system has left and right foot pedals that travel up and down on roller slides on track members mounted on the bicycle frame. An endless drive web passes between the pedals and loops around a driven wheel at one end of the track assembly, and around an idler at the other end of the track assembly. The driven wheel is mounted on the input shaft of a unidirectional transfer arrangement. The transfer arrangement has an aluminum block case or housing, and an input shaft which has a bevel pinion gear on it that meshes with left and right driven bevel gears. These bevel gears each are mounted to an output shaft by means of unidirectional clutch bearings inside the bevel gears. Each bevel gear drives in one direction and idles in the other direction. As the input shaft oscillates back and forth, the output shaft continues to rotate in the same direction. A sprocket wheel can be mounted on the output shaft to power a chain drive or a shaft drive. Springs at the bottom of the pedal stroke cushion the stroke and return some of the energy during the return stroke.

9 Claims, 4 Drawing Sheets

PEDALED PROPULSION SYSTEM

This application is based on my Provisional Patent Application Ser. No. 60/098,531, Aug. 31, 1998, which is also incorporated herein by reference.

BACKGROUND OF THE INVENTION

This invention is directed to pedaled propulsion systems of the type described in my earlier U.S. Pat. No. 5,335,927, which is incorporated by reference. The invention concerns a drive mechanism for a pedaled vehicle having a rotary drive, e.g., a bicycle whose rear wheel is driven by a chain and sprocket drive arrangement. The invention may also be applied to other pedaled vehicles, such as a paddle boat, or to vehicles driven by a shaft rather than a drive chain.

A number of reciprocating foot-lever drives have been proposed for bicycles to be used in stead of the conventional crank and sprocket. Several of these are discussed in my earlier pat. U.S. Pat. No. 5,335,927. Typical of these is the bicycle drive system shown in Wheatley U.S. Pat. No. 584,200. In that case, there are foot levers that are pumped up and down to pull a drive chain back and forth over a sprocket, and a gear arrangement converts the back and forth motion to forward rotary motion to drive the rear wheel. However, the lever action used in these designs does not make optimal use of the muscle dynamics of the leg over the range of motion of the rider's leg. Also, there is no provision to recover energy from the top or bottom of a stroke to assist in the next stroke.

OBJECTS AND SUMMARY OF THE INVENTION

Accordingly, it is an object of the invention to provide a pedaled propulsion system that avoids the drawbacks of the prior art, and which efficiently provides motive power to a bicycle, water craft, or other pedaled vehicle.

According to an aspect of this invention, left and right foot pedals are mounted to travel up and down on roller bearing slides or slides with wheels on track members that are mounted on the bicycle frame. A drive web, i.e., a belt, chain, cable, or similar drive means, passes between the pedals and loops around a driven wheel at one end of the track assembly. The drive web also loops around an idler at the other end of the track assembly. The driven wheel is mounted on the input shaft of a unidirectional gear transfer arrangement based in part on a clutch bearing drive mechanism.

The input shaft is oriented in the fore-and-aft direction, and couples to a transverse output shaft. The input shaft has a bevel pinion gear on it that meshes with left and right driven bevel gears. These bevel gears each are mounted to the output shaft by means of clutch bearings inside the bevel gears. The clutch bearings are unidirectional, so each bevel gear drives in one direction and idles in the other direction. As the drive shaft oscillates back and forth, i.e., reverses direction, the driven shaft continues to rotate in the same direction.

A sprocket wheel can be mounted on the driven shaft to power a chain drive or other mechanism. This example is shown here on a bicycle, but the principle can be used with a paddle boat or any other foot powered vehicle. For that matter, the drive mechanism can include a shaft drive rather than a chain drive, for example, to turn a propeller or screw of a watercraft or other propelling means suitable for the vehicle.

The drive system of this invention can be installed on a standard bicycle. First, the crank can be removed from the crank housing of the bicycle, and this drive assembly can be installed simply by bolting it to the bicycle frame. No cutting of the frame and no welding are required. Here, an automotive timing belt is shown, and the drive wheel is a sprocket timing wheel with teeth that mesh with the drive belt. In other possible embodiments, other systems can be used, e.g., other belts, drive chains, drive cables, etc. Also, the drive sprocket and the uni-directional transfer arrangement can be disposed at the upper end or at the lower end of the track arrangement, as desired.

The pedals are mounted on shoe assemblies that travel up and down on metal slides or tracks on either side of the frame, here going between the crank housing and the upper tube or cross bar of the bicycle frame. Plastics or other materials besides metals would serve the purpose. The pedal position on these shoes is adjustable for the height of the rider. The position of the drive assembly in respect to the upper tube is also adjustable for the comfort and preference of the rider. Means can be included to release the propulsion system from the rear wheel so that the bicycle can be backed up.

On the roller slide mechanisms there are springs attached to bump into stops at the bottom of the stroke which cushion the momentum of the strokes and return this energy back into a positive motion at the commencement of the next stroke. These springs could also be attached in lieu of the stops which in effect will achieve the same end and have the slide bump the springs either at the bottom or at the top of the stroke. The springs could be on top and on bottom on just one side, and would have the same effect as having the two springs on opposite sides.

The above and many other objects, features and advantages of this invention will become apparent from the ensuing description of a preferred embodiment, which is to be considered in connection with the accompanying Drawing.

DETAILED DESCRIPTION OF THE PREFERRED EMBODIMENT

Figure 1:
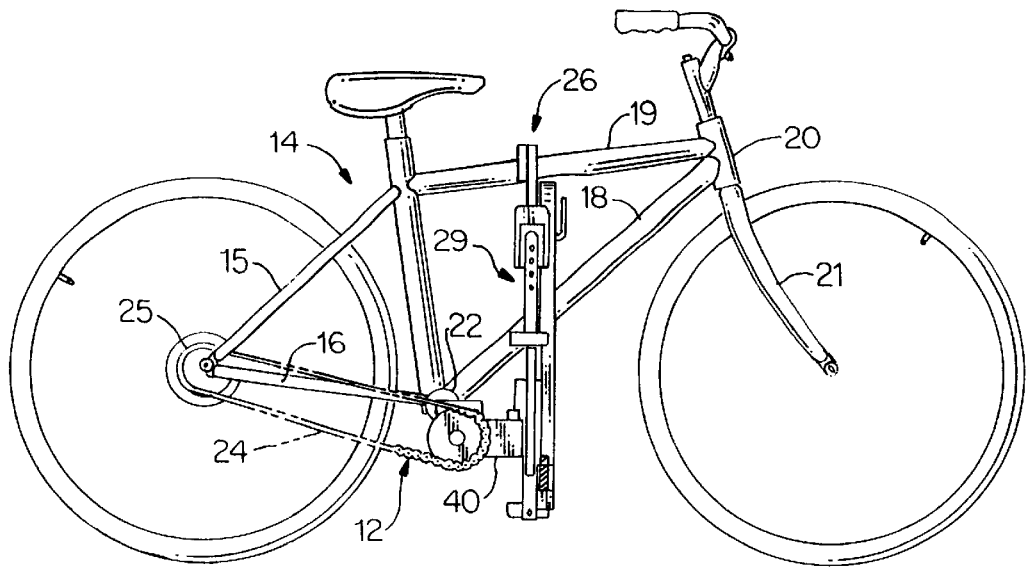
FIG. 1 is a perspective view of a bicycle that incorporates the pedaled propulsion system according to an embodiment of this invention.

With reference to the Drawing, FIG. 1 shows a pedaled propulsion system 10 according to one possible embodiment of this invention, here incorporated with a standard bicycle frame 12. The bicycle frame 12 has a rear fork 14 formed of a seat stay 15 and a chain stay 16, a seat tube 17, lower tube 18, upper tube 19, and steering header 20 in which is mounted the front fork 21. There is a crank housing 22 situated at the juncture of the chain stays 16, the seat tube 17, and the lower tube 18. In this embodiment, the traditional pedal crank has been removed from the crank housing 22. Also, in this bicycle arrangement there are a front drive chain sprocket 23, a drive chain 24, and a rear sprocket 25, the latter being mounted at the hub of the rear wheel, which is situated in the rear fork drop out.

Figure 2:
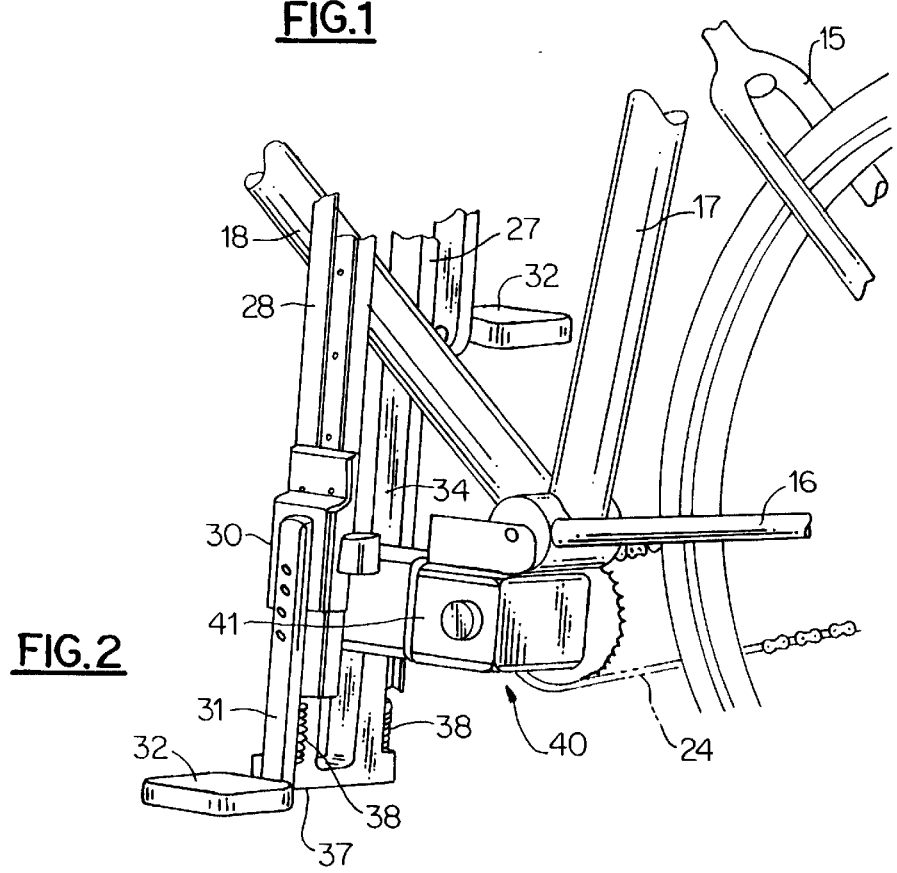
FIG. 2 is an enlargement of a portion of FIG. 1, showing some details of the pedals, slides, and clutch bearing drive mechanism.

The pedaled propulsion system has a rail assembly 26 positioned just ahead of the seat tube 17, and seen from the right side in FIG. 1. The left side view is similar, but a mirror image. The rail assembly 26 has a right rail or track member 27 and a left rail or track member 28 (FIG. 2), that run parallel to one another. There are right and left pedal slide members 29 and 30 that are slidably mounted on the rail or track members 27 and 28, respectively. Each of the pedal slide members has an adjustable pedal bar 31 on which a respective pedal 32 is mounted. The pedal bar is adjustably mounted to the slide member, and can be adjusted up or down, e.g., at one-inch increments. This feature permits the pedal position to be adjusted for the height of the rider. The upper end) of the rail assembly 26 can be moved forward or back to achieve a comforatble pedal stroke for the rider.

Figure 3:
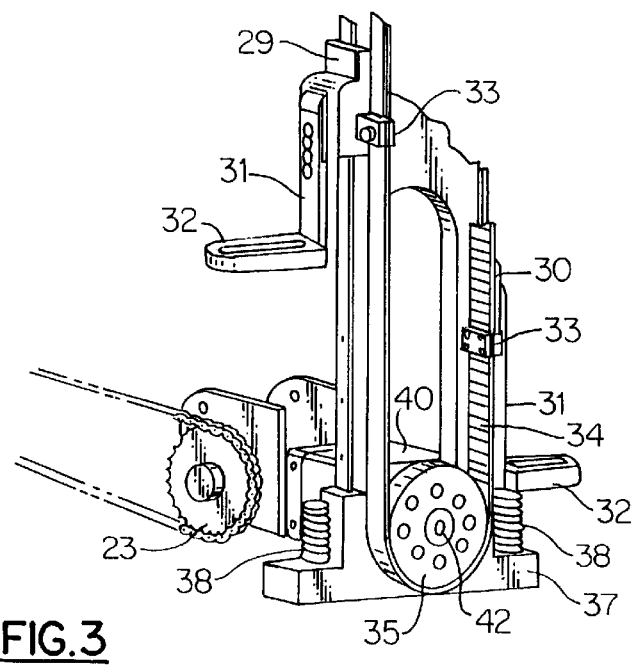
FIG. 3 is a front view, showing the roller bearing slides or slides with wheels, tracks, drive belt, belt-driven wheel (and drive shaft), and the bicycle front sprocket mounted on the driven shaft of the clutch bearing drive mechanism.
Figure 4:
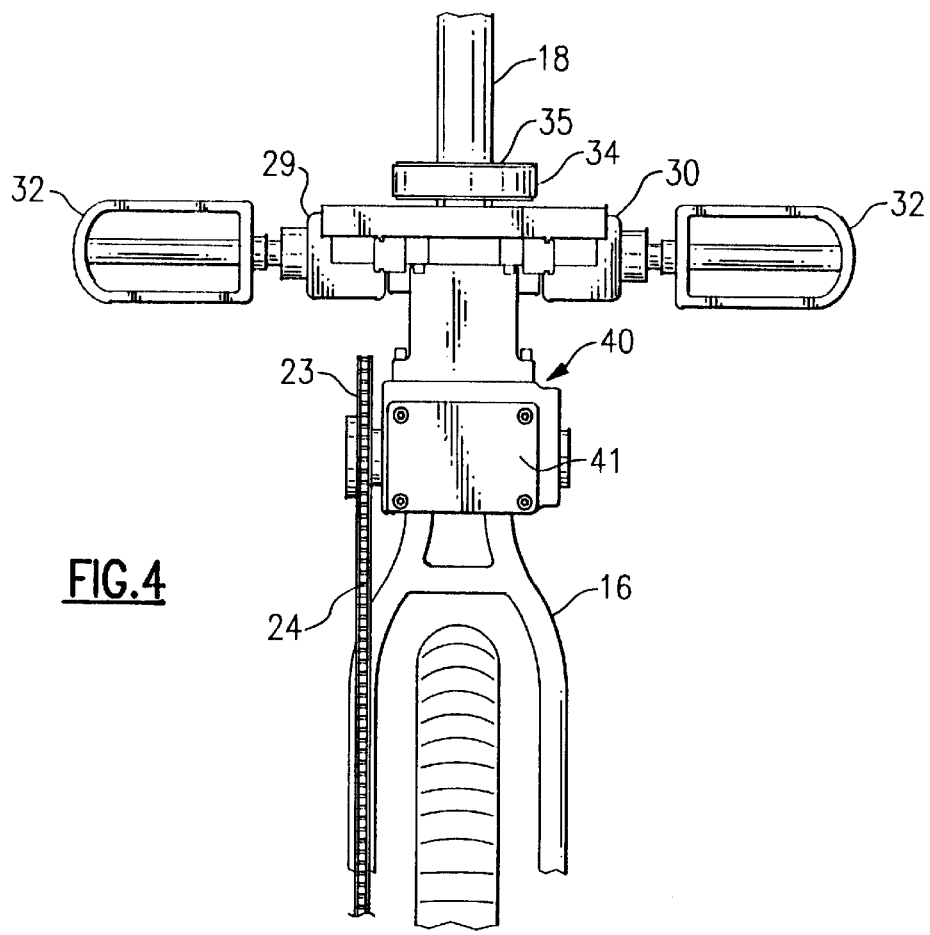
FIG. 4 is a view of the pedaled propulsion system from below.

As shown in FIGS. 3 and 4, the pedal slide members 29, 30 have gripping members 33 that each attach to one side of an endless belt 34. In this case, the belt 34 is in the form of an automotive timing belt, with teeth that engage matching teeth in timing sprocket wheels. The belt 34 travels in a loop situated between the track members 27, 28 and passes over a drive sprocket wheel 35 (at the lower end of the track assembly 26) and an idler wheel 36 (at the upper end of the track assembly). In other embodiments, the drive wheel 35 could be situated at the top of the assembly 26, i.e., near the saddle or seat.

Figure 5:
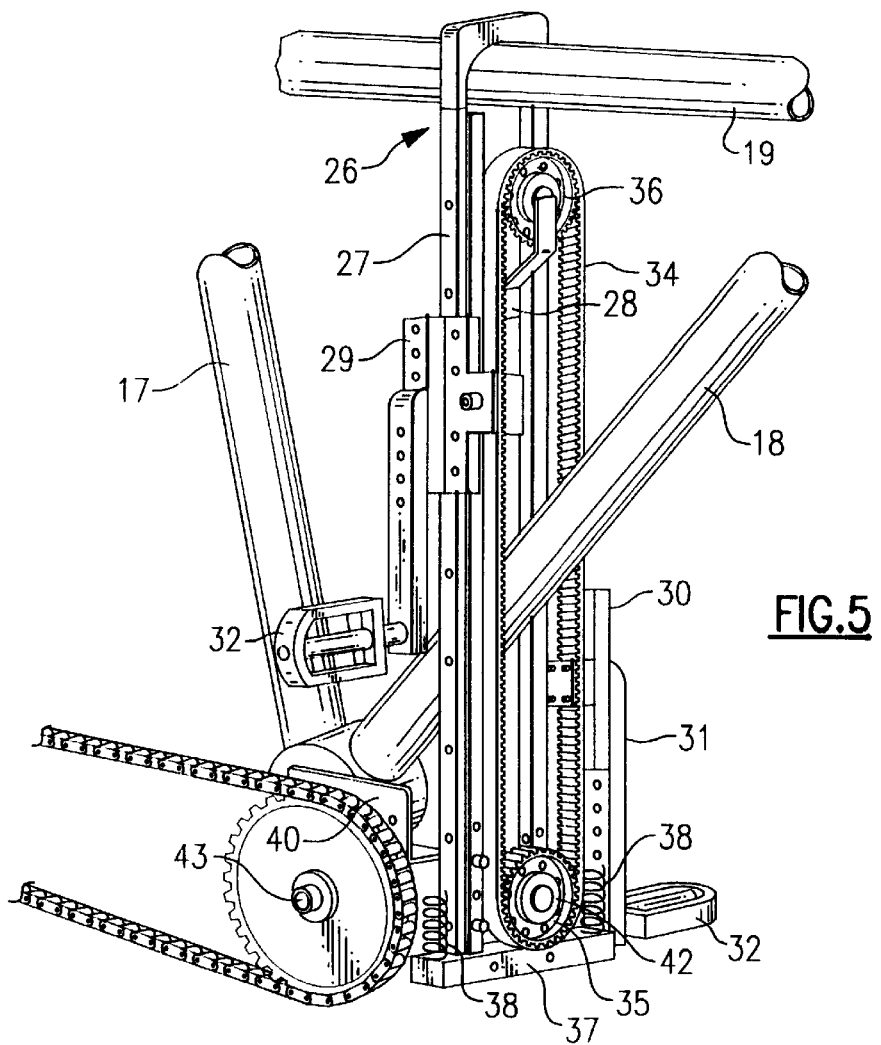
FIG. 5 is a front-quarter view of the bicycle and propulsion system.

There is a stop member 37, as shown in FIGS. 4 and 5, in the form of a cross bar at the bottom end of the track assembly, and left and right springs 38 are situated on this stop member in the path of travel of the respective pedal slide members 29, 30. The springs 38 absorb and store some of the energy at the bottom of each pedal stroke, and then recapture some of this as kinetic energy at the commencement of the next or return stroke. As shown, the springs 38 extend along the track members 27, 28 for only a fraction of the stroke length, and only affect an end portion of the pedal stroke. The size and positions of these springs can vary, and are adjustable according to the rider's preference.

Figure 6:
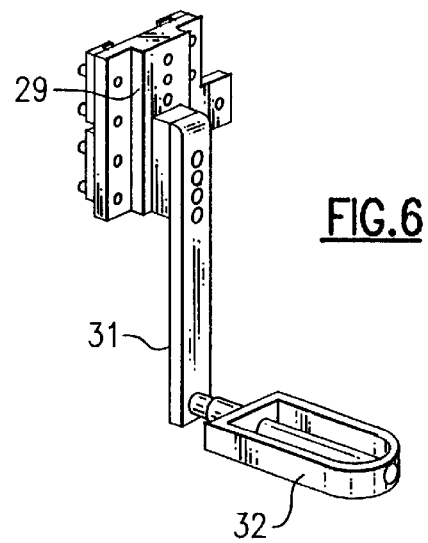
FIG. 6 is a right rear-quarter view thereof.

As shown in FIG. 6, the pedal bar 31 may be mounted to the associated slide member 29 by means of bolts that can be positioned in selected bolt holes in the slide member and pedal bar. However, other possible arrangements can be used to adjust pedal distance. Also shown here are rollers 50 to achieve low friction in respect to the associated track member. Other low friction means could be employed instead.

A clutch-bearing based drive transfer mechanism 40 is situated at the lower end of the pedaled propulsion system 10, and here may be mounted to the (empty) crank housing 22. The mechanism has an aluminum block housing 41, with an input shaft 42 on which the drive sprocket wheel 35 is mounted, and an output shaft 43 on which the front chain drive sprocket 23 is mounted. Here, the input shaft 42 and the output shaft 43 are at right angles because the drive motion needs to be transferred to the drive chain 24. However, in other applications, other angular orientations would be observed. For a shaft-driven application, it may be advantageous for the output shaft 43 to be oriented parallel to the vehicle axis.

Figure 7:
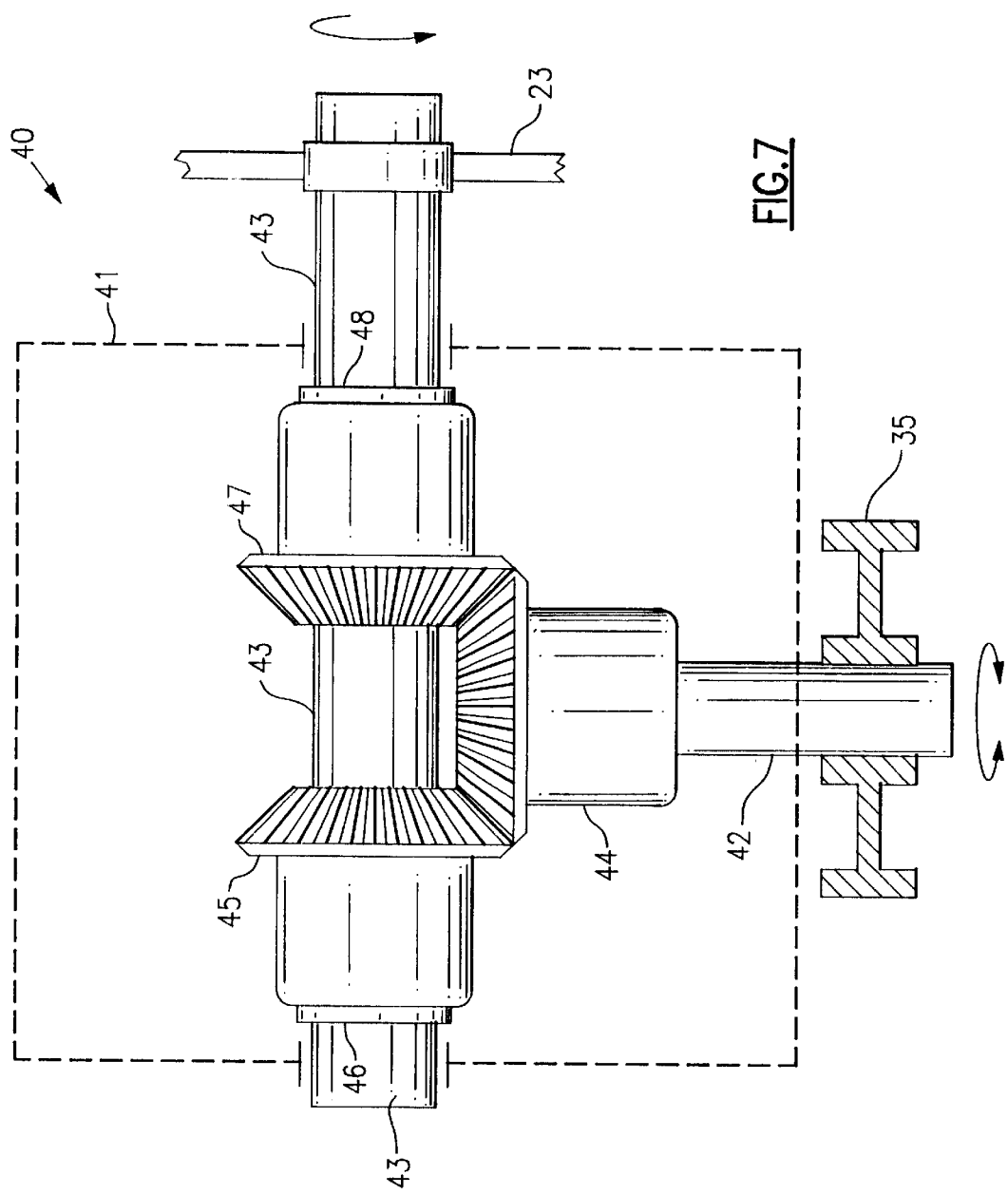
FIG. 7 is a schematic view of the clutch bearing drive mechanism of this embodiment.

FIG. 7 shows, in schematic form, the construction of the drive mechanism 40 of this embodiment. The aluminum housing 41 is represented in dash lines. Here, the input shaft 42 is shown with the associated drive sprocket wheel 35, and the output shaft 43, disposed at a right angle to the input shaft 42, is shown with the associated chain drive front sprocket 23. A bevel pinion gear 44 is mounted directly onto the input shaft 42. There is a left-side bevel gear 45 that meshes with the bevel pinion gear 44. This gear 45 is mounted to the output shaft by means of a clutch bearing 46. The clutch bearing 46 fits onto the shaft 43 and into the bore of the gear 45, so as to be positioned within the gear 45. The clutch bearing is unidirectional, that is, it transmits rotary motion from the gear 45 to the output shaft 43 in one direction, but slips in the other rotational direction. On the right side is another bevel gear 47, which is similarly mounted on a clutch bearing 48 onto the output shaft 43. This gear 47 meshes with the bevel pinion gear 44 on the side opposite the left bevel gear 45, so that when one of the gears 45 or 47 is rotated clockwise, the other gear is driven counter-clockwise. This, plus the action of the clutch bearings 46, 48 ensures that when the input shaft 42 is driven alternately by the pedal action, the output shaft 43 rotates uni-directionally.

In this embodiment, an aluminum block housing 41 is used, but other housings could be used, as appropriate. Other metals could be used. Many modern plastics, with or without re-enforcement, could serve as gear housings. In this embodiment, a belt drive is used incorporating the drive belt 34, sprocket wheel 35 and idler wheel 36. In other possible embodiments, other systems could be used, i.e., other belts, drive chains, drive cables, or other equivalents. Also, in this embodiment, there are springs 38 attached to bump into stops at the bottom of the pedal stroke. These are intended to cushion the momentum of the strokes and return this energy back into a positive motion. These springs could actually be used in place of the stops, and in effect would achieve the same end. The slides may have the springs on either the bottom or the top of their stroke. Also, the springs could be on top and on bottom, both on the same side, and would have the same effect as having the two springs on opposite sides.

The slide-and-track arrangement of this pedaled propulsion system permits the rider to obtain optimum advantage from natural leg extension. The pedaled drive arrangement provides a constant moment arm at the pedals 32 at all positions of the stroke. Because of the action of the slip-clutch drive, the stroke can be made as long or short as desired. Also, because the pedaling motion is a gentle back and forth motion, and not a cranking motion, this drive mechanism is ideal for a recumbent bicycle design.

While this invention has been described in detail in respect to a preferred embodiment, it should be apparent that the invention is not limited to that precise embodiment. Rather, many modifications and variations would present themselves to persons skilled in this art without departure from the scope and spirit of the invention, as defined in the appended claims.

I claim:

1. Pedaled propulsion system for propelling a vehicle comprising a frame, positioning means on the frame defining a position for a person thereon; propelling means supported on the frame for moving the frame relative to an environment; a track assembly including left and right pedal tracks mounted on said frame adjacent said position; left and right pedal slide members slidably mounted on said left and right tracks, respectively, and having pedals against which the person at said position can apply foot pressure to move the left and right slide members reciprocally; a drive web to which said left and right slide members are affixed; a drive wheel at one end of said track assembly and an idler wheel at another end of said track assembly, said drive web passing over said drive wheel and said idler wheel; a gear case situated at one end of the track assembly and having an input shaft connected to said drive wheel and adapted to receive oscillatory rotary motion therefrom; an output shaft; and a gear transfer mechanism within said case and unidirectionally coupled between the output shaft and the input shaft so that the output shaft rotates in one direction; and means coupled to the output shaft for imparting rotary energy from said output shaft to said propelling means.

2. The pedaled propulsion system of claim 1 wherein said gear mechanism within said case includes a driver gear in said case attached to said input shaft; a pair of driven gears in said case, each having gear teeth engaged in mesh with said driver gear, and each positioned on said output shaft; and pair of unidirectional clutch bearings each positioned on said output shaft and mechanically coupled between the output shaft and the respective one of said driven gears, such that as the input shaft oscillates under action of said pedals, the output shaft continues to rotate in a single direction.

3. Pedaled propulsion system for propelling a vehicle comprising a frame, positioning means on the frame defining a position for a person thereon; propelling means supported on the frame for moving the frame relative to an environment; a track assembly including left and right pedal tracks mounted on said frame adjacent said position; left and right pedal slide members slidably mounted on said left and right tracks, respectively and having pedals against which the person at said position can apply foot pressure to move the left and right slide members reciprocally; a drive web to which said left and right slide members are affixed; a drive wheel at one end of said track assembly and an idler wheel at another end of said track assembly, said drive web passing over said drive wheel and said idler wheel; a gear case having an input shaft connected to said drive wheel and adapted to receive oscillatory rotary motion therefrom; an output shaft; a gear transfer mechanism within said case and unidirectionally coupled between the output shaft and the input shaft so that the output shaft rotates in one direction; and means coupled to the output shaft for imparting rotary energy from said output shaft to said propelling means; wherein said gear transfer mechanism within said case includes a driver gear in said case attached to said input shaft; a pair of driven gears in said case, each in mesh with said driver gear, and each positioned on said output shaft; and pair of unidirectional clutch bearings each positioned on said output shaft and mechanically coupled between the output shaft and the respective one of said driven gears, such that as the input shaft oscillates under action of said pedals, the output shaft continues to rotate in a single direction; and wherein said driver gear is a bevel pinion gear, and said driven gears are bevel gears disposed radially opposite one another on said driver gear.

4. The pedaled propulsion system according to claim 2, wherein said clutch bearings are each disposed radially between said output shaft and a bore of the associated driven gear.

5. The pedaled propulsion system according to claim 2, wherein said case includes a block of a lightweight metal.

6. Pedaled propulsion system for propelling a vehicle comprising a frame, positioning means on the frame defining a position for a person thereon; propelling means supported on the frame for moving the frame relative to an environment; a track assembly including left and right pedal tracks mounted on said frame adjacent said position; left and right pedal slide members slidably mounted on said left and right tracks, respectively and having pedals against which the person at said position can apply foot pressure to move the left and right slide members reciprocally; a drive web to which said left and right slide members are affixed; a drive wheel at one end of said track assembly and an idler wheel at another end of said track assembly, said drive web passing over said drive wheel and said idler wheel; a gear case having an input shaft connected to said drive wheel and adapted to receive oscillatory rotary motion therefrom; an output shaft; and a gear transfer mechanism within said case and unidirectionally coupled between the output shaft and the input shaft so that the output shaft rotates in one direction; and means coupled to the output shaft for imparting rotary energy from said output shaft to said propelling means; wherein said track assembly has a stop at one end to define an end to a stroke of the associated pedal slide member, and includes resilient means disposed at said stop and intercepting motion of the associated pedal slide members at an end portion only of said stroke, such that energy near the end of a pedal stroke is stored and recovered at the commencement of a subsequent pedal stroke.

7. The pedaled propulsion system according to claim 1 wherein said pedal slide members are metal shoes that travel on the respective tracks, and each includes roller slide mechanism for travelling on the associated slide.

8. The pedaled propulsion system according to claim 7 wherein said pedal slides include a pedal mounting member which is adjustably mounted thereon to permit adjustment of the placement of the associated pedal according to the size of the person thereon.

9. The pedaled propulsion system according to claim 1 wherein said endless web includes a flexible timing belt having transverse teeth, and said drive wheel is a timing sprocket wheel that meshes with said timing belt.

* * * * *